(12) United States Patent
Hirschvogel et al.

(10) Patent No.: US 6,286,899 B1
(45) Date of Patent: Sep. 11, 2001

(54) WIND DEFLECTOR FOR A MOTOR VEHICLE ROOF

(75) Inventors: Engelbert Hirschvogel, Hofstetten; Thomas Staltmayer, Gauting, both of (DE)

(73) Assignee: Webasto Vehicle Systems International GmbH, Stockdrof (DE)

( * ) Notice: Subject to any disclaimer, the term of this patent is extended or adjusted under 35 U.S.C. 154(b) by 0 days.

(21) Appl. No.: 09/526,527

(22) Filed: Mar. 16, 2000

(30) Foreign Application Priority Data

Mar. 16, 1999 (DE) ................................ 199 11 551

(51) Int. Cl.[7] .................................................. B60J 7/043
(52) U.S. Cl. .......................................... 296/217; 296/180.1
(58) Field of Search ................................ 296/217, 180.1

(56) References Cited

U.S. PATENT DOCUMENTS

| 4,081,194 | * | 3/1978 | Jardin | 296/217 |
|---|---|---|---|---|
| 4,175,785 | * | 11/1979 | Leiter | 296/217 |
| 4,268,085 | * | 5/1981 | Sakai et al. | 296/217 |
| 4,447,086 | * | 5/1984 | Roos et al. | 296/217 |
| 4,482,183 | * | 11/1984 | Grimm et al. | 296/217 |
| 4,630,859 | * | 12/1986 | Bienert et al. | 296/217 |
| 4,659,140 | * | 4/1987 | Fuerst et al. | 296/217 |
| 4,676,546 | * | 6/1987 | Igel | 296/217 |
| 4,781,410 | * | 11/1988 | Gautner et al. | 296/217 |
| 4,971,387 | * | 11/1990 | Bohm et al. | 296/217 |
| 4,986,598 | * | 1/1991 | Yamauchi et al. | 296/217 |
| 5,018,782 | * | 5/1991 | Fiegel et al. | 296/217 |
| 5,018,783 | * | 5/1991 | Chamings et al. | 296/217 |
| 5,306,069 | * | 4/1994 | Beeker et al. | 296/217 |
| 5,609,388 | * | 3/1997 | Hattass et al. | 296/217 |
| 5,833,305 | * | 11/1998 | Watzlawick et al. | 296/217 |

FOREIGN PATENT DOCUMENTS

| 3833865 | * | 4/1990 | (DE) . |
|---|---|---|---|
| 3922940 | * | 7/1990 | (DE) . |
| 39 13 567 | | 10/1990 | (DE) . |
| G 90 07 234.0 | | 10/1990 | (DE) . |
| 195 20 348 | | 8/1996 | (DE) . |
| 0 747 251 | | 12/1996 | (EP) . |

* cited by examiner

Primary Examiner—Joseph D. Pape
Assistant Examiner—Kiran B. Patel
(74) Attorney, Agent, or Firm—Nixon Peabody LLP; David S. Safran

(57) ABSTRACT

A wind deflector for a motor vehicle roof having a roof opening and a cover for closing and exposing the roof opening, has a body with a wind-deflecting surface and which is movable between a rest position and a raised operating position and is formed of at least two body elements which are movable relative to one another between a compact configuration in said rest position and a raised and expanded configuration in the operating position. The body elements are coupled to one another and are pre-tensioned towards their expanded configuration and include at least one base body element and an auxiliary body element. The auxiliary body is connected to a displacement element for raising and lowering both the at least one base body element and the auxiliary body element to and from their operating position, the at least one base body element being displaced downward relative to the auxiliary body element as the auxiliary body is raised.

12 Claims, 3 Drawing Sheets

WIND DEFLECTOR FOR A MOTOR VEHICLE ROOF

BACKGROUND OF THE INVENTION

1. Field of the Invention

This invention relates to a wind deflector for an openable motor vehicle roof which can be moved between a rest position and an operating position, and which has an operating area which has at least two surface elements which can move relative to one another

2. Description of Related Art

A wind deflector of the type mentioned above is known from German DE 195 20 348 C1 and corresponding European Patent 0 747 251. This wind deflector has a base body which is pivotably mounted on the frame of the motor vehicle roof, and two auxiliary plates which can be moved relative to the base body to increase the raising height. The base body and the auxiliary plates are provided in their lateral end areas with a guide means for guiding the auxiliary plate which is adjacent at the time. The auxiliary plate which is uppermost in the raised state of the wind deflector is connected to a raising lever which has the other end supported on the roof frame and which is pre-tensioned by means of a pre-tensioning spring, such that it pre-tensions the wind deflector in the direction of the maximum raised position. The wind deflector is located on the front edge of a roof opening which can be closed by a cover which can be moved in the lengthwise direction of the roof, and with the cover closed, is kept in the rest position by the cover against the pre-tensioning force of a lever, in which position the base body and the two auxiliary plates are pushed together in a rest which is formed on the roof frame such that the auxiliary plates and the base body are located in succession, viewed in the lengthwise direction of the roof. When the cover also releases the pre-tensioned lever of the wind deflector when the roof opening is opened, the wind deflector swings upward with its end attached to the uppermost auxiliary plate in the direction of the pre-tensioning force, by which the wind deflector is extended in the manner of a fan and is raised upward, reaching its maximum operating area. In this position, the auxiliary plates and the base body are essentially on top of one another, i.e., offset relative to one another in the vertical direction.

SUMMARY OF THE INVENTION

The primary object of this invention is to devise a wind deflector which in its rest position occupies only a small volume, offers a large operating area in its operating position and still can be easily moved into its operating position without external elements.

This object is achieved in a wind deflector as claimed of the type mentioned initially in that the surface elements are coupled among one another such that they are pre-tensioned towards the relative position in which the operating area is maximum.

The approach in accordance with the invention has the advantage that, because the maximum operating area need not be effected by additional external elements, simplification of the wind deflector raising mechanism is possible.

Preferably, coupling of the surface elements is effected by adjacent surface elements each being pre-tensioned by a pre-tensioning arrangement which acts between them. This allows a simple and space saving structure of the coupling mechanism.

Preferably, the surface elements can be telescoped into one another. This enables simple and reliable guidance of the surface elements relative to one another.

Preferably, the pre-tensioning arrangement is formed by springs with ends adjoining the opposite surfaces of adjacent surface elements.

In another embodiment, an adjustment element which is pretensioned towards the operating position of the wind deflector engages the uppermost surface element in order to adjust the wind deflector between the rest position and the operating position.

Preferably, the adjustment element is made as a pivot arm which is upwardly pre-tensioned, which can be swung out with its front end, and which with its front end, is coupled to the uppermost surface element and is activated by the closing element of the roof opening, for example, a sliding cover.

These and further objects, features and advantages of the present invention will become apparent from the following description when taken in connection with the accompanying drawings which, for purposes of illustration only, show several embodiments in accordance with the present invention.

BRIEF DESCRIPTION OF THE INVENTION

DETAILED DESCRIPTION OF THE INVENTION

Figure 1:
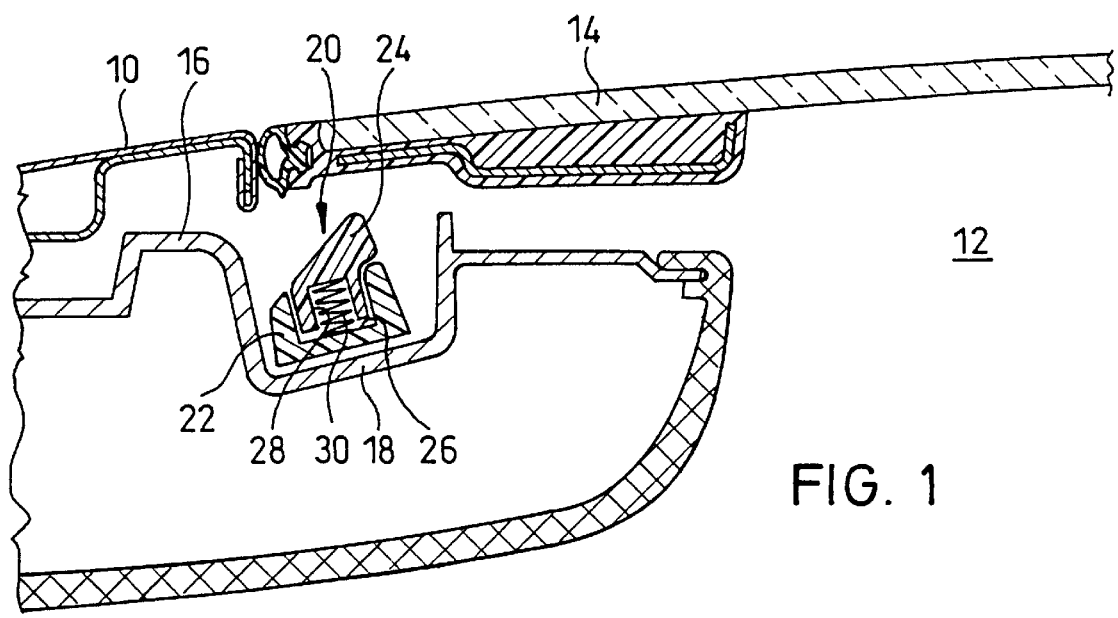
FIG. 1 is a sectional view of a front edge area of an opening in a motor vehicle roof with a first embodiment of a wind deflector in accordance with the invention in its rest position.
Figure 2:
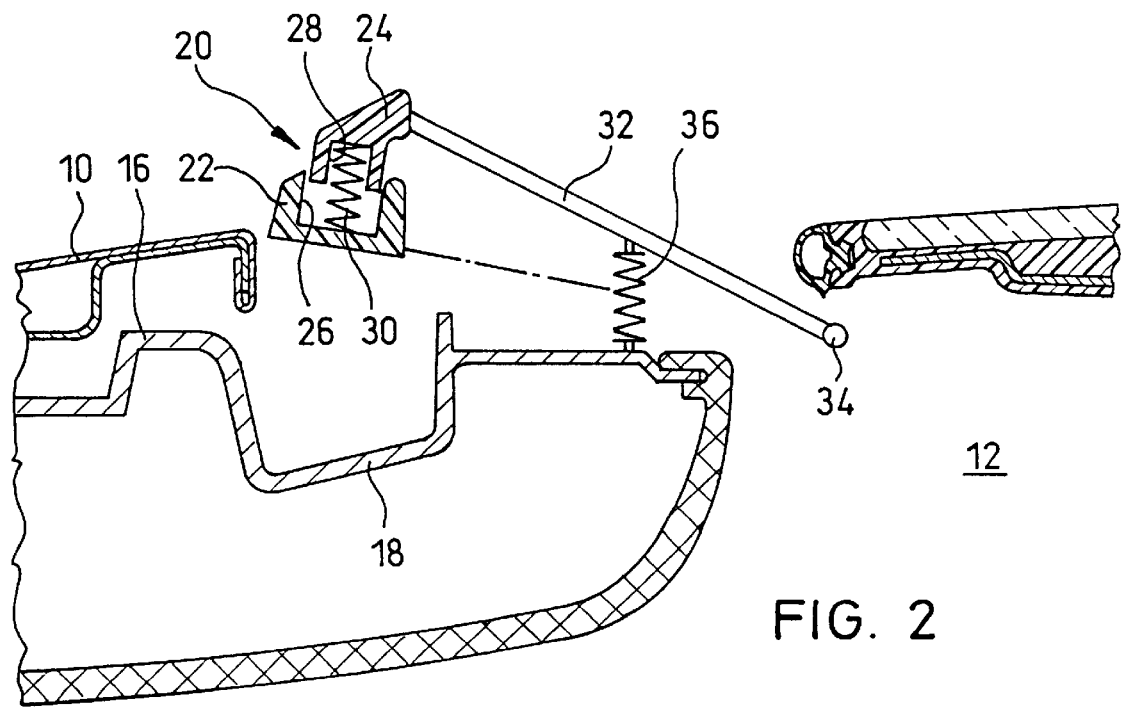
FIG. 2 is a view like FIG. 1, but the wind deflector being shown in its operating position.

FIG. 1 shows an openable motor vehicle roof with a roof opening 12 in a fixed roof skin 10 which is closed by a movable cover 14. In a wind deflector rest 18 which is provided on the front part of a roof frame 16, there is a wind deflector 20 which comprises essentially a base body 22 and an auxiliary body 24 which is movably guided in the base body 22 in a vertical direction. The auxiliary body 24 is located above the base body 22 and is pushed into the base body 22 in the manner of a telescope in the rest position shown in FIG. 1; for this purpose, the base body has a recess 26 for accommodating at least part of the auxiliary body 24. The auxiliary body 24 has a recess 28 which is oriented oppositely and in which a spring element 30 is held which pre-tensions the auxiliary body 24 upward, i.e., away from the base body 22. The auxiliary body 24 is connected to the front end of a raising lever 32 which is shown only in FIG. 2; the back end 34 of lever 32 is pivotably mounted and the lever is pre-tensioned by a spring 36 towards the raised position which is shown in FIG. 2. In the conventional manner, the raising lever 32, in the closed position which is shown in FIG. 1, is pressed down by the closed cover 14 by means of a hold-down device (not shown) against the pre-tensioning force, by which the lever 32 keeps the auxiliary body 24 pushed into the recess 26 of the base body 22 against the pre-tensioning force of the spring 30.

If the cover 14 is opened, as shown in FIG. 2, by being pushed rearward, ultimately, it releases the raising lever 32, by which the lever, as a result of the pre-tensioning force of the spring element 30, is raised upward at its front end, and in doing so, likewise, raises the auxiliary body 24 of the wind deflector 20 upward. As soon as the base body 22 disengages from the wind deflector rest 18, it is likewise raised up until it extends above the level of the fixed roof skin 10. For this purposes, the base body 22 and the auxiliary body 24 are mechanically coupled such that the auxiliary body 24 entrains the base body 22 as soon as the auxiliary body has been moved so far out of the recess 26 that the base body 22 and the auxiliary body 24 together form the maximum operating area of the wind deflector 20. The position of the wind deflector 20 shown in FIG. 2 represents an operating position in which it reduces wind noise at the front edge of the roof opening 12 which has now been exposed. The telescope-like arrangement of the base body 22 and the auxiliary body 24 enlarges the operating area of the wind deflector 20 in the operating position relative to the rest position. The relative pre-tensioning of the base body 22 and the auxiliary body 24 away from one another by means of the spring element 30 increases the mechanical stability of the wind deflector 20 in the operating position which is shown in FIG. 2, by which rattling noise and the like are effectively suppressed.

Figure 3:
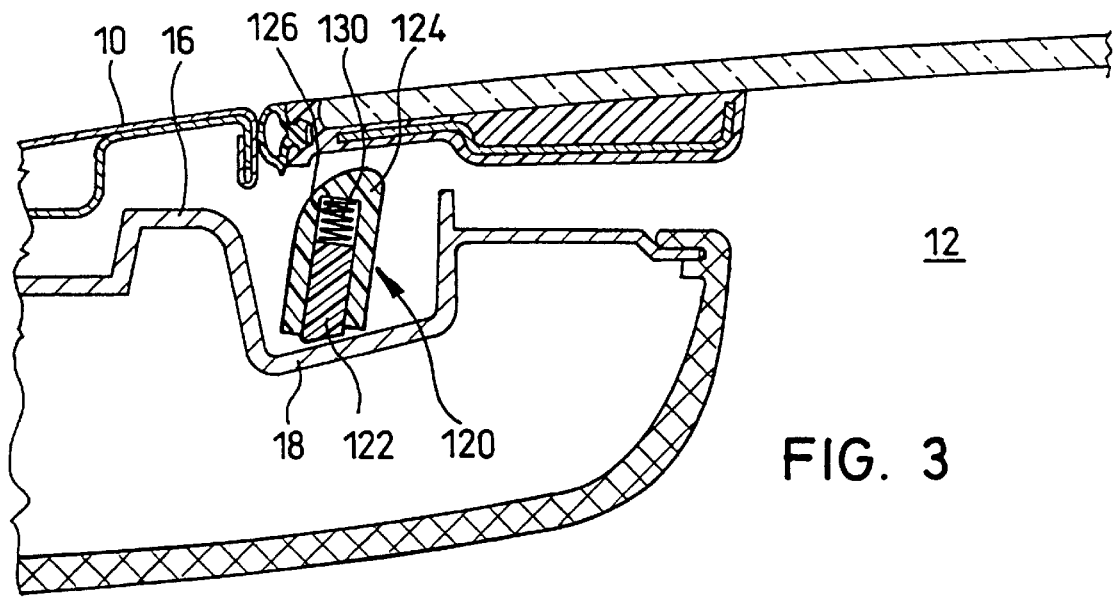
FIG. 3 is a view like FIG. 1, but showing a second embodiment of a wind deflector in accordance with the invention.
Figure 4:
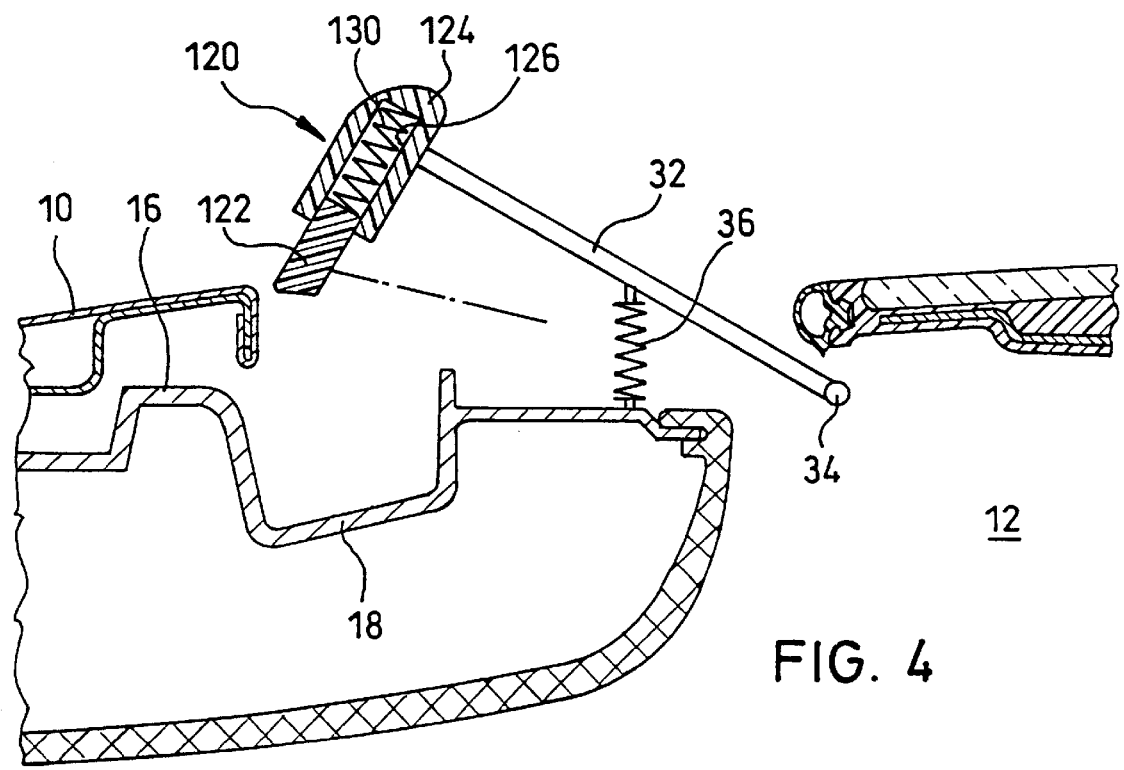
FIG. 4 is a view of the FIG. 3 wind deflector in its operating position.

FIGS. 3 & 4 show a modified wind deflector 120 which differs from the wind deflector 20 shown in FIGS. 1 and 2 mainly in that the auxiliary body 124 has a recess 126 which, in the rest position of the wind deflector 120 shown in FIG. 3, accommodates the base body 122 in the manner of a telescope. In this embodiment as well, the auxiliary body 124 and the base body 122 are pre-tensioned by means of a spring element 130 away from one another in the direction of the maximum operating area, the spring element 30 likewise being held in the recess 126 of the auxiliary body 124 and acting between opposing surfaces of the base body 122 and the auxiliary body 124, specifically between the top end of the base body 122 and the top end of the recess 126. Here also, the auxiliary body 124 can be raised by means of the raising lever 32, by which the wind deflector 120 is moved out of the rest position shown in FIG. 3 with the cover 14 closed, in which position the base body 122 is telescoped into the auxiliary body 124, into the operating position which is shown in FIG. 4 in which the wind deflector 120 is raised and the base body 122 is pushed almost completely out of the auxiliary body 124 by the pre-tensioning action of the spring element 130 in order to increase the operating area of the wind deflector 120 relative to the rest position. The base body 122 is thus guided in the recess 126 by sliding.

While in the embodiment as shown in FIGS. 1 and 2 the base body 22 and the auxiliary body 24 can be displaced relative to one another essentially in the vertical direction of the roof, the displacement direction in the embodiment as shown in FIGS. 3 and 4 is angled rearward by roughly 30° with reference to the vertical direction of the roof.

Instead of two wind deflector bodies, if necessary, basically also three or more bodies can be used, by which the ratio between the vertical dimension in the rest position and the maximum operating area in the operating position can be increased.

Figure 5:
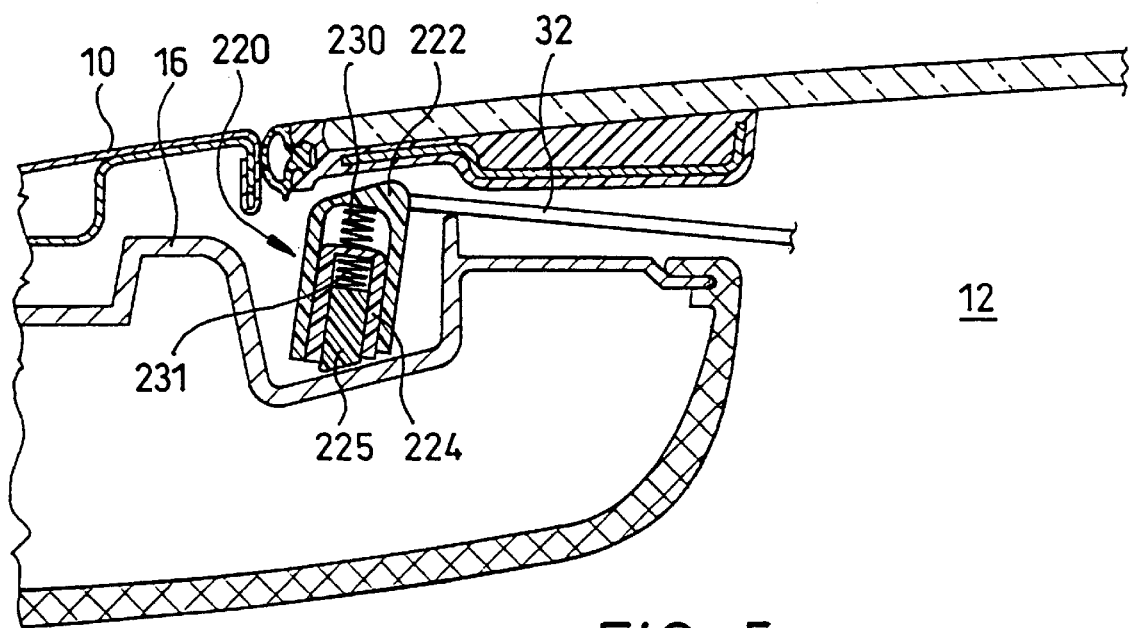
FIG. 5 shows a three element version of the second embodiment wind deflector in its rest position.

A wind deflector 220 with 3 surface elements 222, 224, and 225 which are arranged telescoped into one another is shown in FIG. 5. Here, the raising lever 32 is coupled to the outer top surface element 222. The second surface element 224 is movably supported in a holding slot of the first surface element 222 which is downwardly open, between the first surface element 222 and the second surface element 224 there being a compression spring 230.

The second surface element 224 has a holding slot which is downwardly open and in which the third surface element 225 is movably guided. Between the second surface element 224 and the third surface element 225 there is a second compression spring 231. The compression springs 230 and 231 provide for elastic pre-loading of the wind deflector 220 into the raised operating position.

In all versions, the raising lever 32 is elastically pre-loaded in the raising direction by the springs 36 which are indicated in FIG. 4, so that the spring elements 30, 130,230 and 231 are used only to move the surface elements relative to one another and to guide them without play and rattling. The surface elements are pushed together out of the operating position by a driver part located on the movable cover running onto a ramp which is provided on the raising lever 32, e.g., in the manner shown in U.S. Pat. No. 4,081,194 which is hereby incorporated by reference.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A wind deflector for a motor vehicle roof having a roof opening and a cover for closing and exposing the roof opening, comprising a body having a wind-deflecting surface and which is movable between a rest position and a raised operating position and is formed of at least two body elements which are movable relative to one another between a compact configuration in said rest position and a raised and expanded configuration in said operating position, the body elements being coupled to one another and being pre-tensioned towards said expanded configuration; wherein said body elements comprise at least one base body element and an auxiliary body element, said auxiliary body being connected to a displacement element for raising and lowering both the at least one base body element and the auxiliary body element to and from said operating position; and wherein said at least one base body element is downwardly displaceable relative to said auxiliary body element as the auxiliary body is raised.

2. A wind deflector as claimed in claim 1, wherein said coupling of the body elements is effected by adjacent body elements each being pre-tensioned by spring elements which act between them.

3. A wind deflector as claimed in claim 1, wherein said coupling of the body elements is effected by the body elements being pretensioned by a spring element which acts between first and last of said body elements.

4. A wind deflector as claimed in claim 3, wherein the body elements telescopically arranged with respect to one another.

5. A wind deflector as claimed in claim 1, wherein the body elements are telescopically arranged with respect to one another.

6. A wind deflector as claimed in claim 1, wherein spring elements adjoin opposing surfaces of adjacent body elements.

7. A wind deflector as claimed in claim 1, wherein the body elements are vertically arranged with an uppermost one of the body elements disposed above a lowermost one of the body elements with the uppermost of the body elements being engaged by a displacement element which is pre-tensioned towards the operating position for moving the wind deflector between the rest position and the operating position.

8. A wind deflector as claimed in claim 7, wherein the displacement element is operable by movement of the cover of the vehicle roof.

9. A wind deflector as claimed in claim 7, wherein the displacement element comprises a lever arm which is pre-tensioned in an upward direction, wherein a rear end of the lever arm is pivotably mounted so as to enable the lever arm to swing upward at a front end thereof, said front end being coupled to the uppermost one of the surface elements.

10. A wind deflector as claimed in claim 9, further comprising a rest for having a wall which receives the body elements in the rest position, said rest being located below roof level; wherein the body elements are pushed together against said wall of the rest against the pre-tensioning force of the spring elements by said lever arm when the cover is in a position closing the roof opening and the body elements being raised above the roof level into the operating position by the pivot arm when said cover exposes the roof opening.

11. A wind deflector as claimed in claim 1, wherein the body elements are displaceable at an angle between roughly 90° and roughly 45° relative to a plane of the roof.

12. A wind deflector as claimed in claim 1, wherein the body elements have a contouring on front surfaces thereof which, together, in the operating position, at least in part, provide wind-deflecting surface of the deflector body with a smooth-surfaced wind guiding profile.

* * * * *